US007664921B2

(12) United States Patent
Okawa et al.

(10) Patent No.: US 7,664,921 B2
(45) Date of Patent: Feb. 16, 2010

(54) METHOD FOR ACCESSING SHARED MEMORIES AND MULTIPROCESSOR SYSTEM USING THE METHOD

(75) Inventors: Hideo Okawa, Fukuoka (JP); Kazunori Uemura, Fukuoka (JP); Kunio Yamaguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 11/412,074

(22) Filed: Apr. 26, 2006

(65) Prior Publication Data

US 2006/0218441 A1    Sep. 28, 2006

Related U.S. Application Data

(63) Continuation of application No. PCT/JP03/16987, filed on Dec. 26, 2003.

(51) Int. Cl.
   *G06F 12/00* (2006.01)
(52) U.S. Cl. .................. 711/148; 714/13; 714/748; 714/749
(58) Field of Classification Search ................. 711/148; 714/13, 748, 749
   See application file for complete search history.

(56) References Cited

U.S. PATENT DOCUMENTS

| | | | | |
|---|---|---|---|---|
| 5,588,122 A | * | 12/1996 | Garcia | 710/52 |
| 5,778,419 A | * | 7/1998 | Hansen et al. | 711/112 |
| 5,896,394 A | * | 4/1999 | Fukuda | 714/712 |
| 5,896,492 A | * | 4/1999 | Chong, Jr. | 714/3 |
| 6,108,739 A | * | 8/2000 | James et al. | 710/113 |
| 6,263,452 B1 | * | 7/2001 | Jewett et al. | 714/9 |
| 6,370,606 B1 | * | 4/2002 | Bonola | 710/260 |
| 6,389,515 B1 | * | 5/2002 | Schibinger et al. | 711/141 |
| 7,162,545 B2 | * | 1/2007 | Sudo | 709/201 |
| 7,213,044 B2 | * | 5/2007 | Tjong et al. | 709/200 |
| 7,353,374 B1 | * | 4/2008 | Trimberger | 713/1 |

FOREIGN PATENT DOCUMENTS

| | | |
|---|---|---|
| JP | 1-231128 | 9/1989 |
| JP | 4-23537 | 1/1992 |
| JP | 11-120154 | 4/1999 |
| JP | 2000-148523 | 5/2000 |
| JP | 2001-166960 | 6/2001 |
| JP | 2001-522087 | 11/2001 |
| WO | WO 99/23559 | 5/1999 |

OTHER PUBLICATIONS

International Search Report dated Feb. 17, 2004.
Japanese Office Action dated Sep. 9, 2008, from the corresponding Japanese Application.

* cited by examiner

*Primary Examiner*—Matt Kim
*Assistant Examiner*—John P Fishburn
(74) *Attorney, Agent, or Firm*—Fujitsu Patent Center

(57) ABSTRACT

A method for accessing shared memory cards from each of plural processor cards is disclosed. The shared memory cards are composed of a shared memory card of an operating system and a shared memory card of a standby system in a redundant configuration, and each of plural processor cards individually access the shared memory cards. Each of the plural processor cards is connected to the shared memory card of the operating system and the shared memory card of the standby system in a point-to-point structure via corresponding serial buses and executes data transmission on a one to one basis to/from the shared memory card of the operating system and the shared memory card of the standby system.

8 Claims, 11 Drawing Sheets

FIG.11

| | TYPE OF BUS | THE NUMBER OF bits OF BUS [bit] | OPERATING FREQUENCY OF BUS [MHz] | TRANSFER RATE [Gbps] | THE NUMBER OF UNITS CONNECTING TO BUS | TRANSFER RATE OF ENTIRE SYSTEM [Gbps] |
|---|---|---|---|---|---|---|
| CONVENTIONAL SYSTEM (MULTI-CONNECTION STRUCTURE) | PARALLEL BUS | 87 | 33 | 2.9 | 1 | 2.9 |
| PRESENT INVENTION SYSTEM (POINT-TO-POINT STRUCTURE) | SERIAL BUS | 1 | 2660 | 2.1 | 20 | 42.0 |

METHOD FOR ACCESSING SHARED MEMORIES AND MULTIPROCESSOR SYSTEM USING THE METHOD

CROSS-REFERENCE TO RELATED APPLICATION

This application is a U.S. continuation application filed under 35 USC 111(a) claiming benefit under 35 USC 120 and 365(c) of PCT application JP2003/016987, filed Dec. 26, 2003. The foregoing application is hereby incorporated herein by reference.

BACKGROUND OF THE INVENTION

1. Field of the Invention

The present invention generally relates to a method for accessing shared memories and a multiprocessor system using the accessing method in a distributed processing system in which various operations are processed by using plural processors.

2. Description of the Related Art

Recently, the development of the CDMA (code division multiple access) communication system has rapidly progressed and a processor system, which can operate in high-volume traffic corresponding to the expansion of mobile phone services and the popularization of data communications of huge amount of audio and video data in a wireless network, has been required. The processor system is generally realized by a multiprocessor system (for example, refer to Patent Document 1).

FIG. 1 is a block diagram showing a conventional multiprocessor system having shared memory cards. In the multiprocessor system shown in FIG. 1, n processor cards 101a to 101n, shared memory cards 104 and 105, and bus control cards 106 and 107 are connected to a global bus 108 in a multi-connection structure.

In the shared memory cards 104 and 105 in a redundant configuration, the same information which is common to the processor cards 101a to 101n is stored. The bus control cards 106 and 107 have a function to adjust the global bus 108 which the processor cards 101a to 101n use to access the shared memory cards 104 and 105. The processor cards 101a to 101n renew a common resource in the shared memory cards 104 and 105 while executing requested processes.

[Patent Document 1] Japanese Laid-Open Patent Application No. 2001-166960

However, corresponding to the expansion of services in an IDC (Internet data center) and communication services in the 3G, a large amount of communication data must be processed at high speed. However, in a multiprocessor system which processes large amounts of data by a distributed processing system, the conventional technology has difficulty in expanding the services due to limitations in increasing the throughput.

In the conventional multiprocessor system which includes shared memory cards shown in FIG. 1, in which the processor cards 101a to 101n and the shared memory cards 104 and 105 are connected by the global bus 108 in the multi-connection structure, as one of methods to increase the throughput, there is a method to add a new processor card. However, when a processor card is newly added, signal quality is degraded due to the increase of the connecting workload on the global bus 108. Consequently, there is a limitation to increasing the number of processor cards.

As a different method, there is a method to increase the throughput of the global bus 108. However, there is a limitation to increasing the throughput of the global bus 108 due to a limitation of the protocol of the global bus 108.

In addition, since the plural processor cards 101a to 101n are connected to the global bus 108 in order to access the shared memory cards 104 and 105, when the global bus 108 is hung up by some problem of a processor card 101x, other processor cards cannot access the shared memory cards 104 and 105.

Consequently, in the conventional multiprocessor system which requires large throughput, there are surely limitations for the throughput. In addition, when one of the processor cards has some trouble, the trouble interferes with processes in the other processor cards.

SUMMARY OF THE INVENTION

Accordingly, the present invention may provide a method for accessing shared memory cards and a multiprocessor system using the accessing method, in which a processor card can be added without degrading signal quality; and even when a transmission line connecting to a shared memory card is hung up by some trouble in one processor card, the other processor cards can access the shared memory cards without having any damage caused by the trouble in the processor card.

According to an aspect of the present invention, there is provided a method for accessing a shared memory card of an operating system and a shared memory card of a standby system in a redundant configuration from each of plural processor cards individually. The accessing method includes the step of executing data transmission from/to each of the plural processor cards to/from the shared memory card of the operating system and the shared memory card of the standby system on a one to one basis, by connecting each of the plural processor cards to the shared memory card of the operating system and the shared memory card of the standby system in a point-to-point structure via corresponding serial buses.

According to an embodiment of the present invention, since the above structure is used, a processor card can be added without degrading signal quality; in addition, when a transmission line between a processor card and a shared memory card is hung up due to some trouble in the processor card, another processor card can access the shared memory card without suffering any damage from the trouble.

BRIEF DESCRIPTION OF THE DRAWINGS

Other objects and further features of the present invention will be apparent from the following detailed description when read in conjunction with the accompanying drawings.

FIG. 11 is a table showing a comparison between a conventional multiprocessor system and the multiprocessor system according to the embodiment of the present invention.

DESCRIPTION OF THE PREFERRED EMBODIMENT

Figure 1:
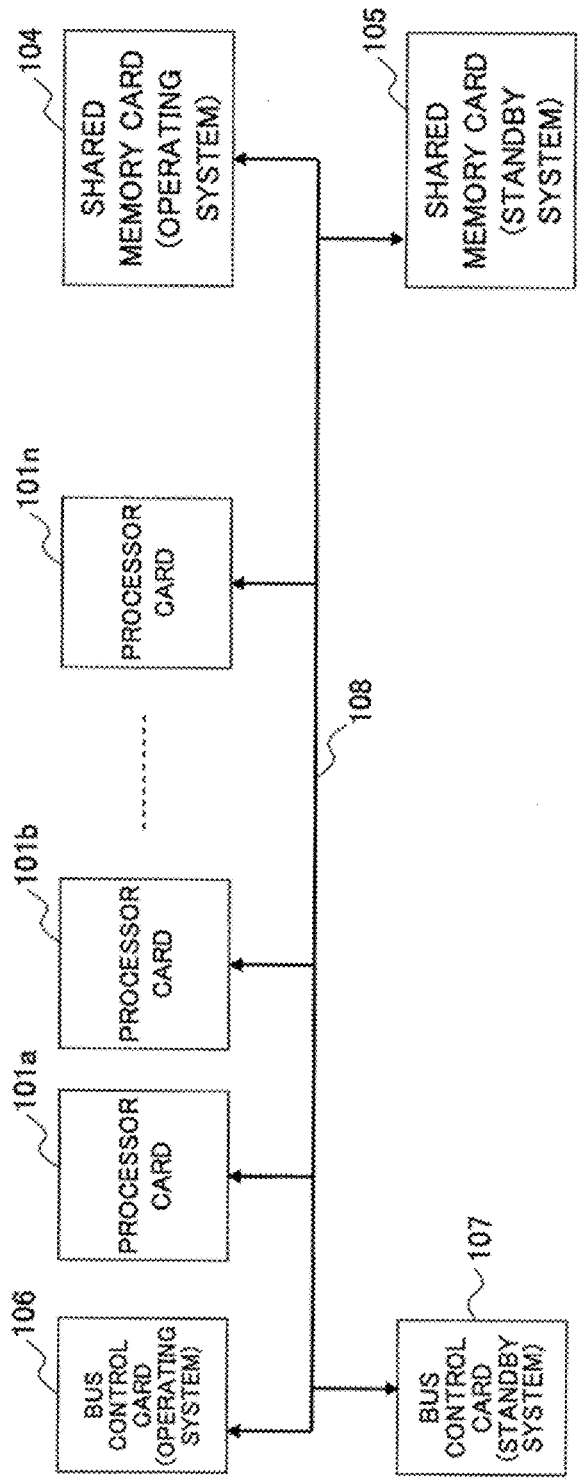
FIG. 1 is a block diagram showing a conventional multiprocessor system which includes shared memory cards.

Referring to the drawings, an embodiment of the present invention is explained.

Figure 2:
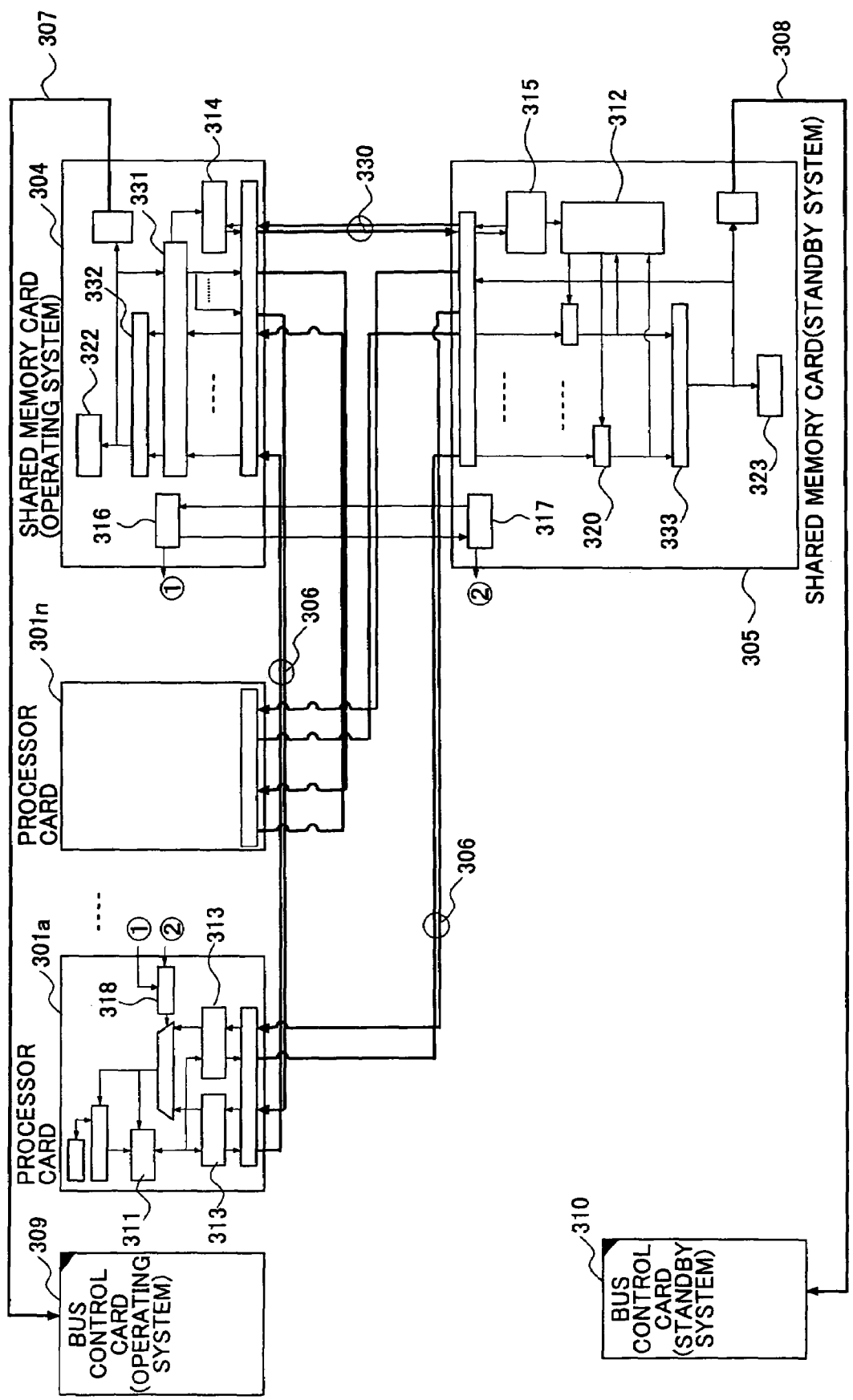
FIG. 2 is a block diagram showing a multiprocessor system according to an embodiment of the present invention.

FIG. 2 is a block diagram showing a multiprocessor system according to the embodiment of the present invention.

In FIG. 2, each of processor cards 301a through 301n is connected to shared memory cards 304 and 305 by a point-to-point structure via corresponding serial buses 306. In order to monitor an access state from each of the processor cards 301a through 301n to the shared memory cards 304 and 305, a monitoring bus 307 is connected between the shared memory card 304 and a bus control card 309, and a monitoring bus 308 is connected between the shared memory card 305 and a bus control card 310.

In this, when a processor card is described individually, the processor card is referred to as the processor card 301; in addition, when all the processor cards are described, the processor cards are also referred to as the processor cards 301.

The shared memory cards 304 of the operating system and the shared memory card 305 of the standby system have a redundant configuration. When some trouble occurs in the shared memory card 304 of the operating system, the shared memory card 305 of the standby system takes over a process from the shared memory card 304 of the operating system in order to continue the process of each processor card 301.

When the shared memory card 304 has some trouble, in order for the shared memory card 305 to take over an unprocessed command accessing the shared memory card 304 from the processor cards 301a through 301n, the processor card 301 includes a command resending section 311 and the shared memory card 305 includes a response monitoring section 312 which works only in a standby state.

When serial high-speed transmission is executed by connecting each of the processor cards 301a through 301n with the shared memory cards 304 and 305 by a point-to-point structure via the serial buses 306, an intermittent fault in which a part of data transmitted at high speed is lost may occur. Therefore, the transmitted data must be saved from the intermittent fault. In order to save the transmitted data from the intermittent fault, a command number checking and resending section 313 is included in each of the processor cards 301a through 301n, and in addition, a command number checking and resending section 314, which works only in an operating state, is included in the shared memory card 304, and a response number checking section 315, which works only in a standby state, is included in the shared memory card 305. In this, each of the processor cards 301a through 301n includes two command number checking and resending sections 313 corresponding to the shared memory cards 304 and 305.

The shared memory card 304 includes a system determining section 316 which determines the system (operating) of its own card and the shared memory card 305 also includes a system determining section 317 which determines the system (operating or standby) of its own card. A system selecting section 318 in each of the processor cards 301a through 301n selects a response from the shared memory card 304 or 305 by notification of the operating state or the standby state from the system determining sections 316 and 317 of the corresponding shared memory cards 304 and 305.

Figure 3:
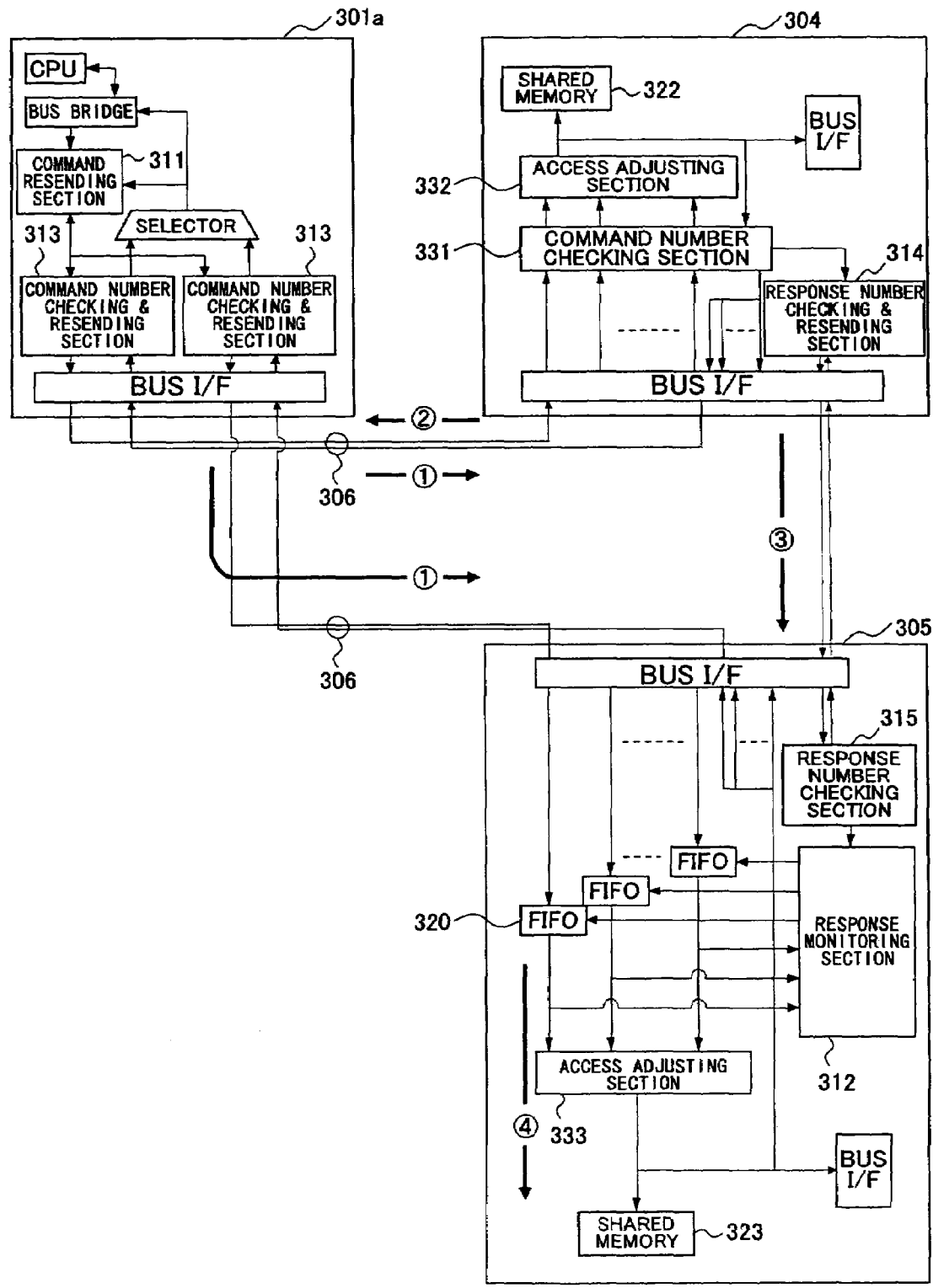
FIG. 3 is a diagram showing a method in which a shared memory card of a standby system takes over a process of a command supplied from a processor card from a shared memory card of an operating system according to the embodiment of the present invention.

FIG. 3 is a diagram showing a method in which the shared memory card 305 takes over a process of a command supplied from the processor card 301a from the shared memory card 304. Referring to FIG. 3, the method is explained. In FIG. 3, the shared memory card 304 (operating system) and the shared memory card 305 (standby system), which are connected to the processor card 301a by a point-to-point structure via the serial buses 306, always store the same information which is shared by the processor cards 301a through 301n. When the shared memory card 304 has some trouble, the shared memory card 305 takes over a process of a command supplied from the processor card 301a.

The processor card 301a generally stores a command (access command) in a FIFO (storage stack) in the command resending section 311 when accessing the shared memory cards 304 and 305. The command is transferred to the shared memory cards 304 and 305 (①) shown in FIG. 3).

Generally, the shared memory card 304 returns a response to the processor card 301a as a result processed the command (②) shown in FIG. 3). The command resending section 311 in the processor card 301a checks existence of the response for the stored command, and when the response exists, the command stored in the FIFO is discarded.

When the shared memory card 304 has some trouble when the command has not been processed, the shared memory card 304 cannot return the response. Consequently, the command resending section 311 in the processor card 301a does not receive a response for the stored command within a predetermined time. At this time, the command resending section 311 resends the command stored in the FIFO to the shared memory cards 304 and 305 by reading the command.

When the shared memory card 305 (standby system) receives the command sent again from the processor card 301a, the shared memory card 305 stops a command from another processor card 301b (not shown). Then, the shared memory card 305 executes the process by the command sent again from the processor card 301a by taking over the process from the shared memory card 304.

In order for the shared memory card 305 (standby system) to take over a process of a command supplied from the processor card 301a from the shared memory card 304 (operating system), a method which uses the response monitoring section 312 in the shared memory card 305 is explained.

The shared memory card 305 only stores a command from each processor card 301 in a FIFO 320 at a normal operating time and does not access a shared memory 323. The response monitoring section 312 checks existence of a response (③) shown in FIG. 3) from the shared memory card 304 for the command stored in the FIFO 320. When the response exists, the response monitoring section 312 discards the command stored in the FIFO 320. That is, the shared memory card 304 is working normally.

When the shared memory card 304 has some trouble, a response is not sent from the shared memory card 304 within a predetermined time, that is, a response does not exist for the command stored in the FIFO 320 and the shared memory card 305 assumes an operating state. When the shared memory card 305 becomes the operating state, the shared memory card 305 processes the command stored in the FIFO 320. With this, taking over the process from the shared memory card 304 can be executed by the shared memory card 305 ((4) shown in FIG. 3).

Figure 4:
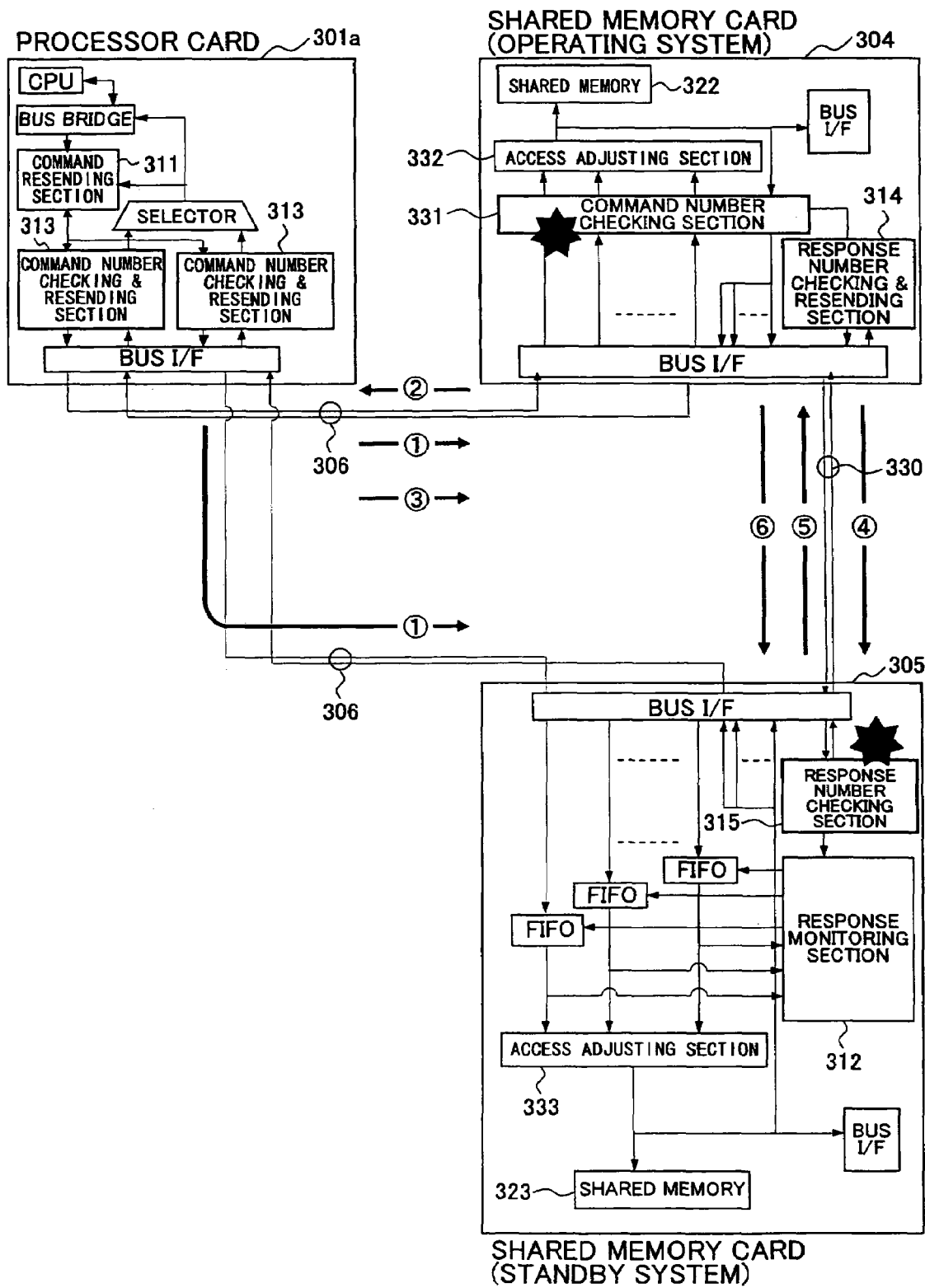
FIG. 4 is a diagram showing a method in which transferring data are saved from an intermittent fault in a serial bus according to the embodiment of the present invention.

FIG. 4 is a diagram showing a method in which transferring data are saved from an intermittent fault in the serial bus 306. Referring to FIG. 4, the method is explained. In FIG. 4, the serial buses 306 connect the processor card 301a to the shared memory cards 304 and 305, and a serial bus 330 connects the shared memory card 304 to the shared memory card 305.

In order to prepare against occurrence of an intermittent fault in a serial bus 306 when a command is output from the processor card 301a ((1) shown in FIG. 4), the command number checking and resending section 313 in the processor card 301a attaches a number to the output command and stores the command in an internal FIFO at the same time.

In the shared memory card 304, a command number checking section 331 checks the number of a received command from each processor card 301 and determines whether the number of the received command is lost. That is, when an intermittent fault occurs in a serial bus 306, the number is lost. Only when the number of the received command is not lost, the command is sent to an access adjusting section 332. At the same time, a response to which only the command number of a command received last is attached is returned to the processor card 301a ((2) shown in FIG. 4); in this, the response is shown in a format of FIG. 7 (A).

In this, a selected command by the access adjusting section 332 is supplied to a shared memory 322 and the shared memory 322 is accessed.

In the processor card 301a, only when the command number returned from the shared memory card 304 is equal to that of the command stored in the internal FIFO, the stored command is discarded.

When the processor card 301a does not receive a response whose command number is equal to that in the internal FIFO within a predetermined time, which is a data transferring time of one reciprocating time between the processor card 301a and the shared memory card 304, the processor card 301a resends all commands stored in the internal FIFO in order from the first ((3) shown in FIG. 4).

By the above operation, when an intermittent fault occurs in the serial bus 306, which is a transmission line between the processor card 301a and the shared memory card 304, data transmission can be saved by resending the command.

Next, in the serial bus 330, which is a transmission line between the shared memory cards 304 and 305, a case in which an intermittent fault occurs in a response transferring time from the shared memory card 304 to the shared memory card 305 is studied. In order to monitor the response of the shared memory card 304, the shared memory card 304 includes the response number checking and resending section 314 whose function is the same as that of the command number checking and resending section 313 of the processor card 301a, and the shared memory card 305 includes the response number checking section 315 whose function is the same as that of the command number checking section 331 of the shared memory card 304.

The same control between processor card 301a and the shared memory card 304 is applied to the response transmission between the shared memory cards 304 and 305. With this, the data transmission can be saved at the time when an intermittent fault occurs in the serial bus 330.

That is, the shared memory card 304 attaches a number to an output response by the response number resending section 314, and stores the response in the internal FIFO at the same time, and sends the response to the shared memory card 305 ((4) shown in FIG. 4).

On the other hand, in the shared memory card 305, the response number checking section 315 checks the number of a received response from the shared memory card 304 and determines whether the number of the received response is lost. Only when the number of the received response is not lost, the response is sent to an access adjusting section 333. At the same time, a response to which only the response number of a response received last is attached is returned to the shared memory card 304 ((5) shown in FIG. 4); in this, the response is shown in a format of FIG. 10 (B).

In this, a selected response by the access adjusting section 333 is supplied to the shared memory 323 and the contents in the shared memory 323 are renewed.

In the shared memory card 304, only when the response number returned from the shared memory card 305 is equal to that of the response stored in the internal FIFO of the response number checking and resending section 314, the storing response is discarded.

When the response number returned from the shared memory card 305 is not equal to that of the response stored in the internal FIFO of the response number checking and resending section 314 within a predetermined time, which is a data transferring time of one reciprocating time between the shared memory cards 304 and 305, the shared memory card 304 resends all responses stored in the internal FIFO in order from the first ((6) shown in FIG. 4).

By the above operation, when an intermittent fault occurs in the serial bus 330 which is a transmission line between the shared memory cards 304 and 305, data transmission can be saved by resending the response.

Figure 5:
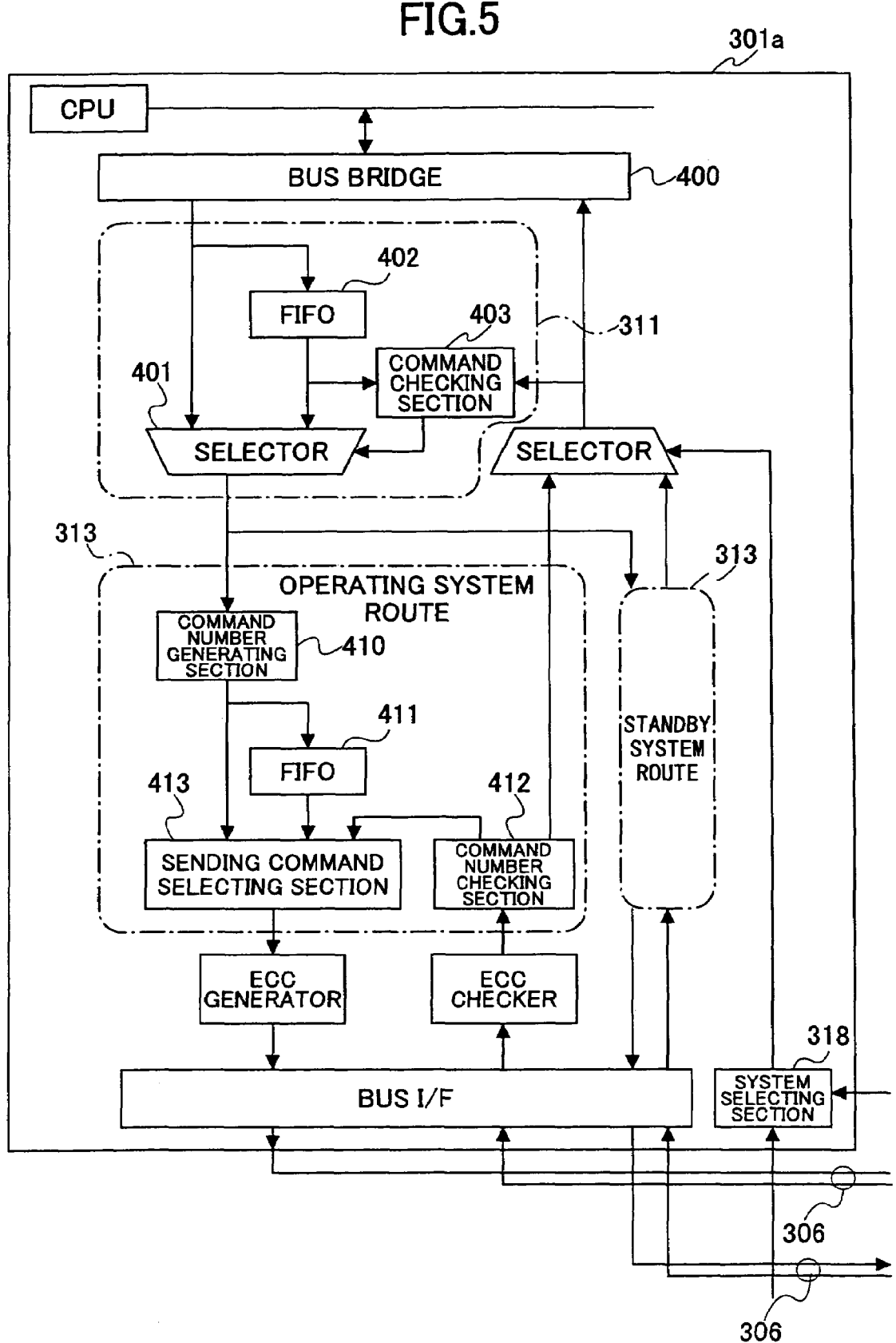
FIG. 5 is a diagram showing a structure of the processor card in detail according to the embodiment of the present invention.

FIG. 5 is a diagram showing a structure of the processor card 301a in detail according to the embodiment of the present invention. As shown in FIG. 5, the command resending section 311 has a first command outputting route and a second command outputting route. In the first command outputting route, a command is output from a bus bridge 400 to a selector 401. In the second command outputting route, a command from the bus bridge 400 is stored in a FIFO 402 and is sent again from the FIFO 402 to the selector 401 by control of a command checking section 403 which checks existence of a response from the shared memory cards 304 and 305. The command checking section 403 normally causes the selector 401 to select the first command outputting route and select the second command outputting route when a response does not exist.

The command number checking and resending section 313 includes a command number generating section 410 which generates a command number to a sending command selected by the command resending section 311 and attaches the generated command number to the sending command, and a FIFO 411 which temporarily stores the sending command. The command number checking and resending section 313 further includes a command number checking section 412 which determines whether a command number included in a response from the shared memory card 304 or 305 is equal to that of the sending command, and a sending command selecting section 413 which selects a command output from the command number generating section 410 when the same command number exists, and selects a command output from the FIFO 411 when the same command number does not exist and outputs the selected command.

Figure 6:
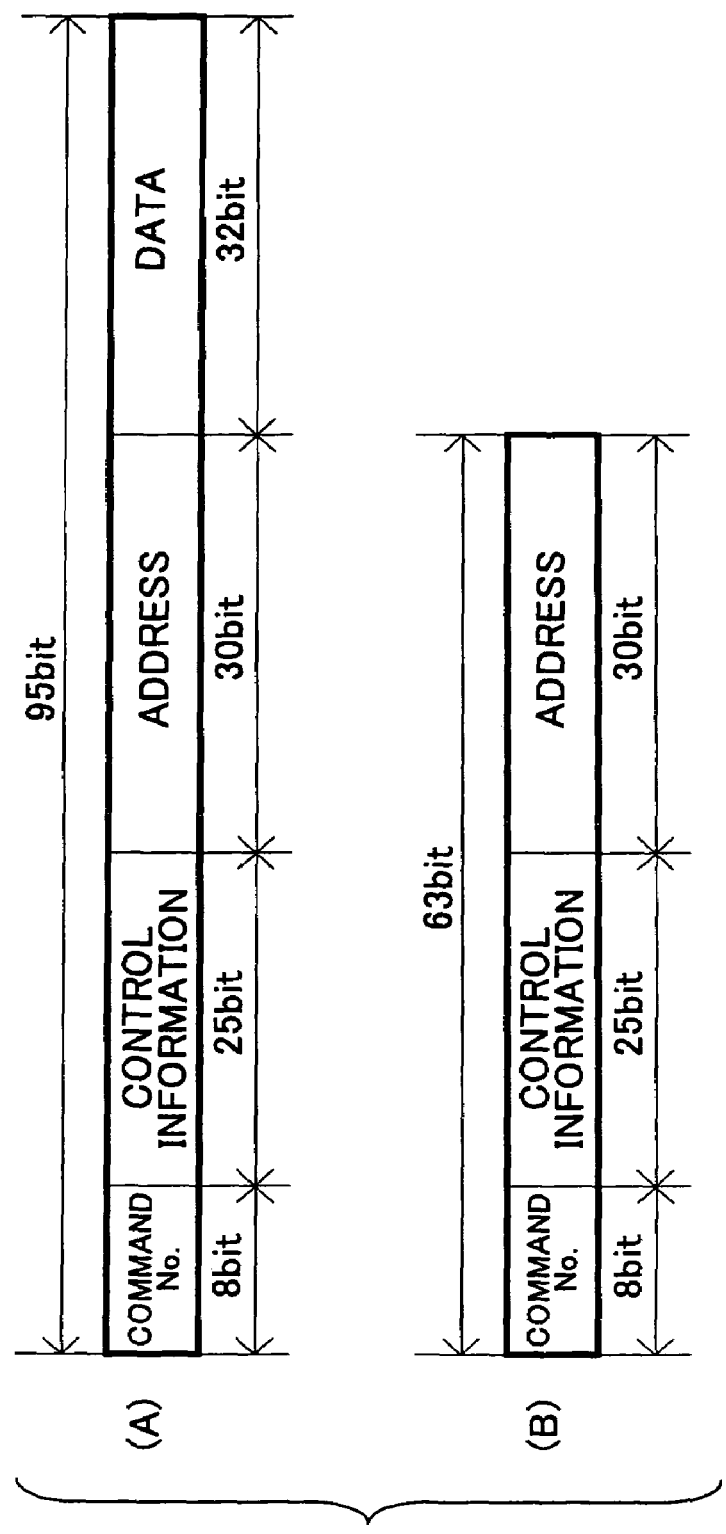
FIG. 6 is a diagram showing formats of commands from the processor card shown in FIG. 2.

FIG. 6 is a diagram showing formats of commands from the processor card 301. In FIG. 6, (A) shows a format at the time of write access and the format is composed of a command number, control information, an address, and data. In addition, (B) shows a format at the time of read access and the format is composed of a command number, control information, and an address.

Figure 7:
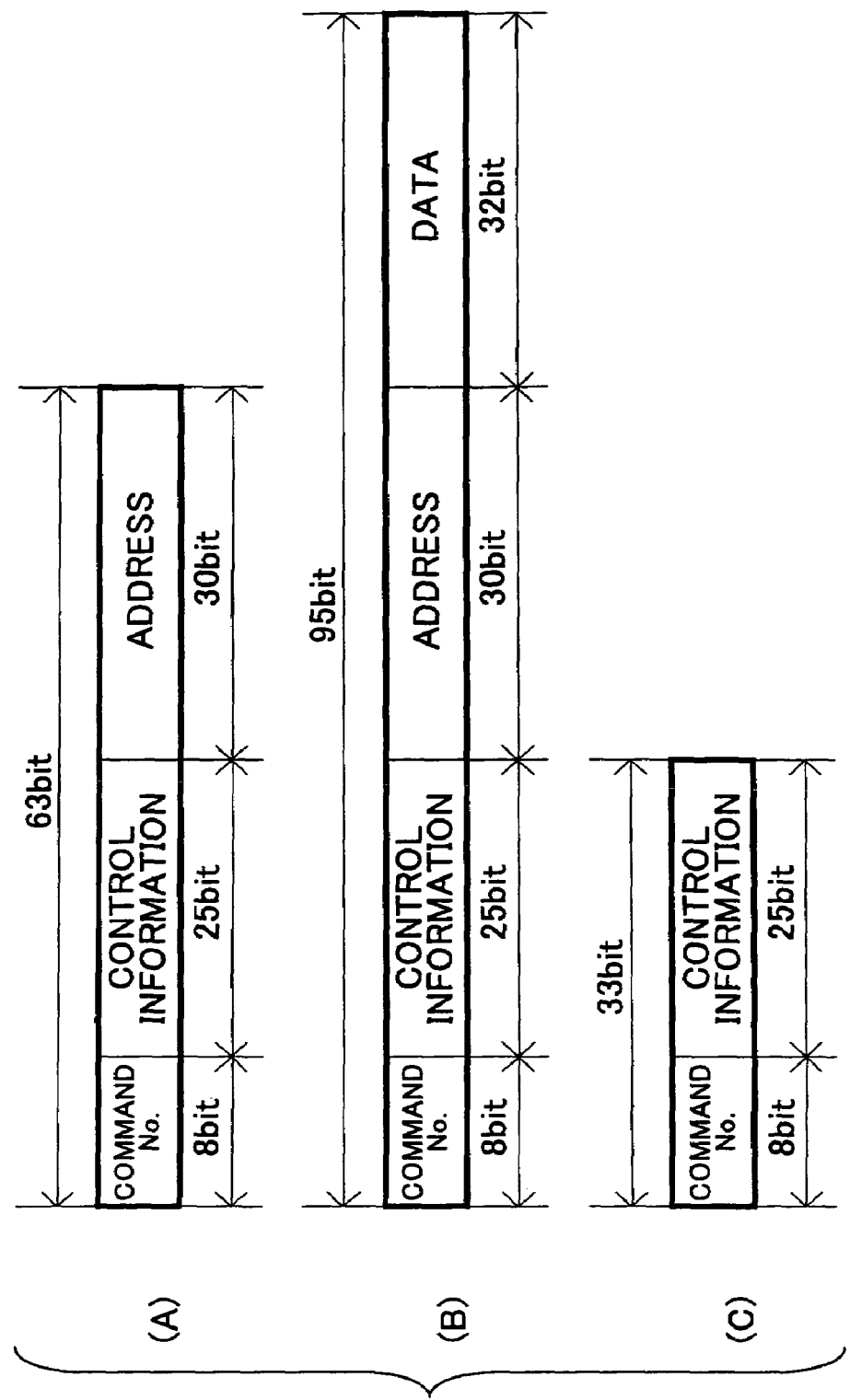
FIG. 7 is a diagram showing formats of responses from the shared memory cards of the operating and standby systems shown in FIG. 2.

FIG. 7 is a diagram showing formats of responses from the shared memory cards 304 and 305. In FIG. 7, (A) shows a format of a response of the shared memory card 304 for write access from the processor card 301 and the format is composed of a command number, control information, and an address. In addition, (B) shows a format of a response of the shared memory card 304 for read access from the processor card 301 and the format is composed of a command number, control information, an address, and data. Further, (C) shows a format of a response of the shared memory card 305 at the time of returning a command number and the format is composed of a command number and control information.

Figure 8:
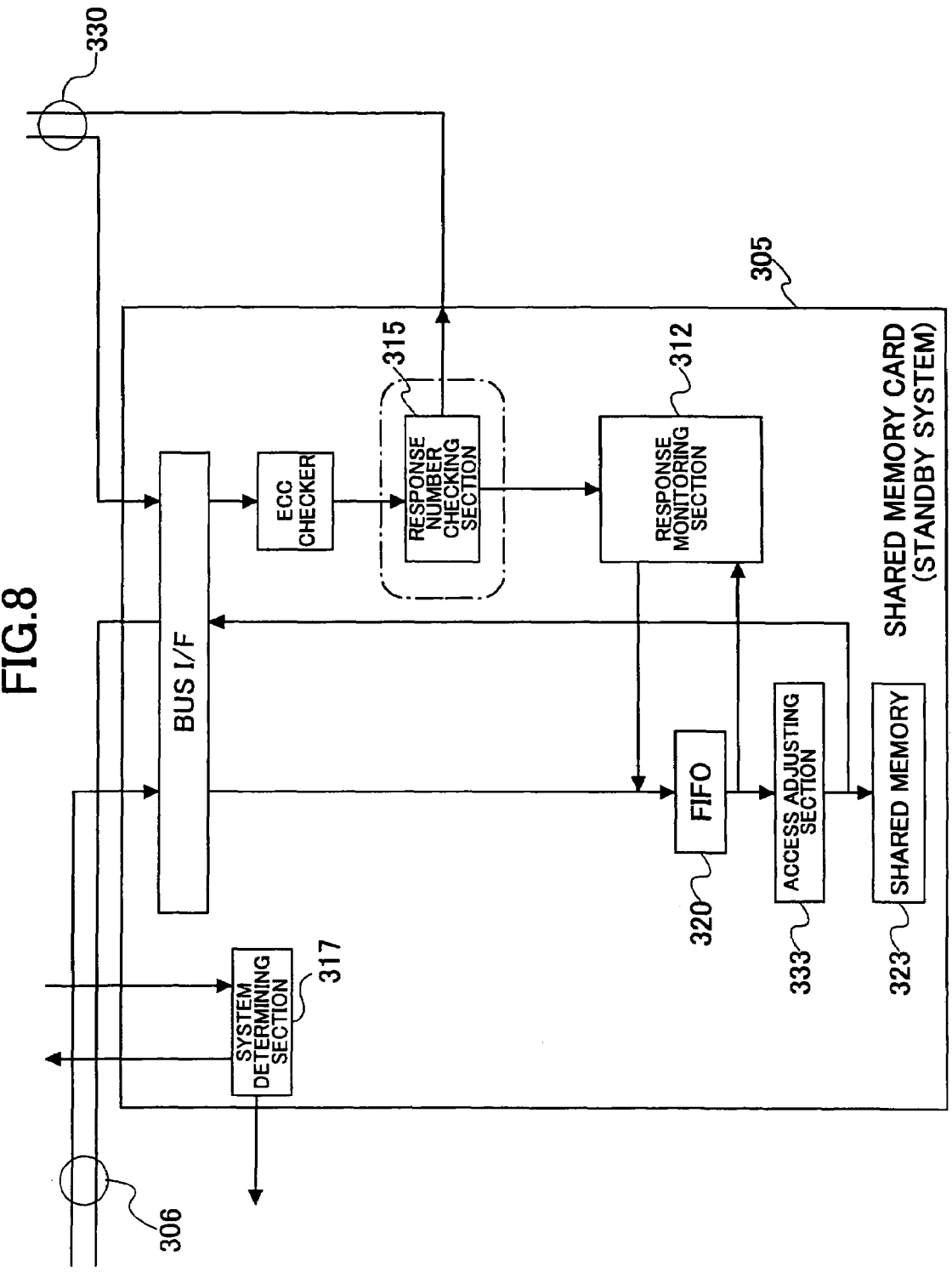
FIG. 8 is a diagram showing a structure of the shared memory card of the standby system in detail according to the embodiment of the present invention.

FIG. 8 is a diagram showing a structure of the shared memory card 305 (standby system) in detail according to the embodiment of the present invention. In FIG. 8, the response monitoring section 312 determines whether a response from the shared memory card 304 for a command stored in the FIFO 320 exists. When the response exists, the command stored in the FIFO 320 is discarded. In a case where the response does not exist, when the shared memory card 305 assumes an operating state and starts a process, a command stored in the FIFO 320 is supplied to the shared memory 323.

The response number checking section 315 checks the number of a received response from the shared memory card 304 and determines whether the number of the received response is lost. Only when the number of the received response is not lost, the response is sent to the access adjusting section 333. At the same time, a response to which only the response number of a response received last is attached is returned to the shared memory card 304.

Figure 9:
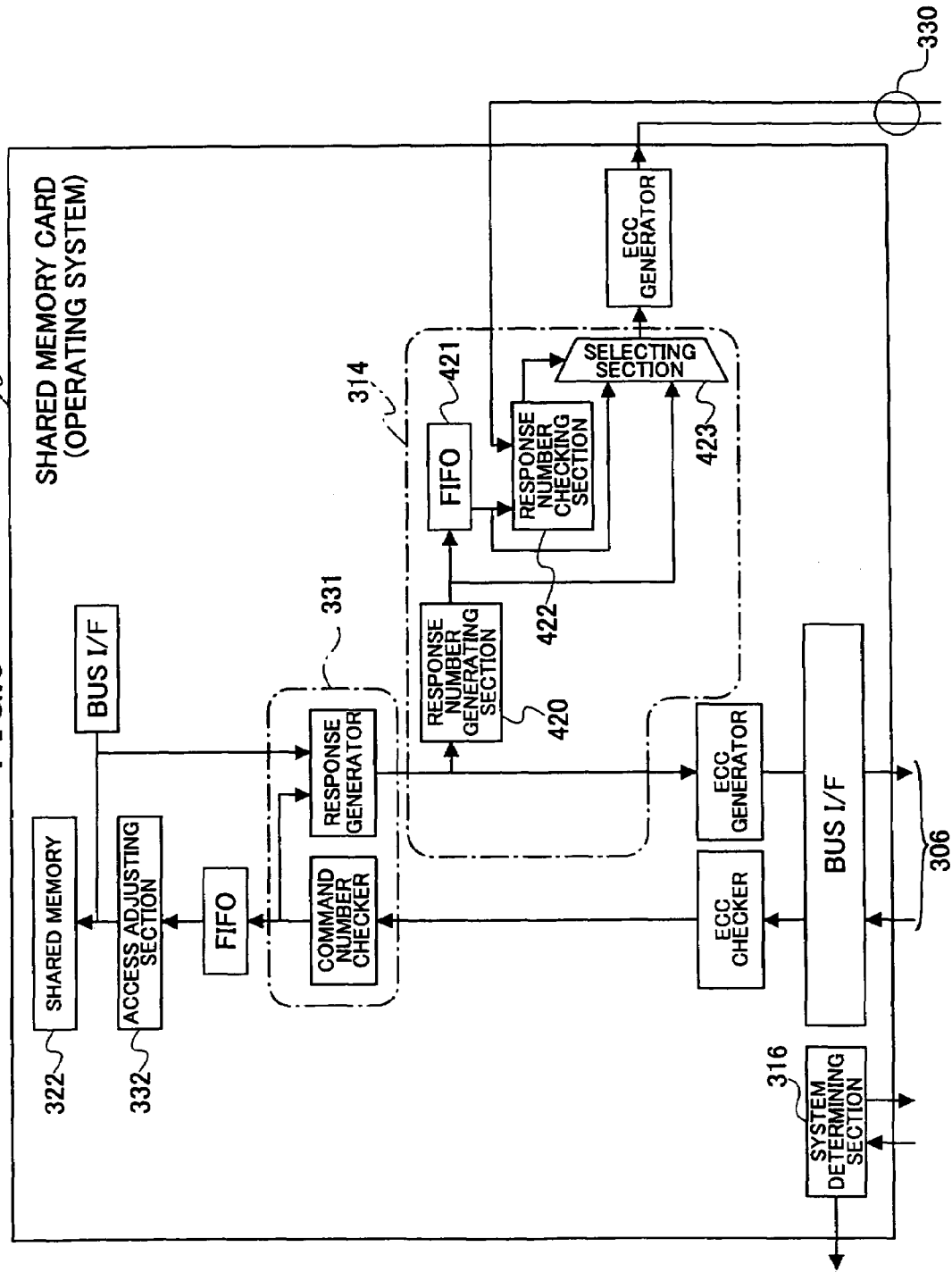
FIG. 9 is a diagram showing a structure of the shared memory card of the operating system in detail according to the embodiment of the present invention.

FIG. 9 is a diagram showing a structure of the shared memory card 304 (operating system) in detail according to the embodiment of the present invention. In the shared memory card 304, the command number checking section 331 checks the number of a received command from each processor card 301 and determines whether the number of the received command is lost. Only when the number of the received command is lost, the command is sent to the access adjusting section 332. At the same time, a response to which the command number of a command received last is attached as the response number is returned to the processor card 301a.

The response number checking and resending section 314 includes a response number generating section 420 which generates a response number to a sending response output from the command number checking section 331 and attaches the generated response number to the sending response, and a FIFO 421 which temporarily stores the sending response. The response number checking and resending section 314 further includes a response number checking section 422 which determines whether a response number included in a response from the shared memory card 305 is equal to that of the sending response, and a selecting section 423 which selects a response output from the response number generating section 420 when the same response number exists and selects a response output from the FIFO 421 when the same response number does not exist and outputs the selected response.

Figure 10:
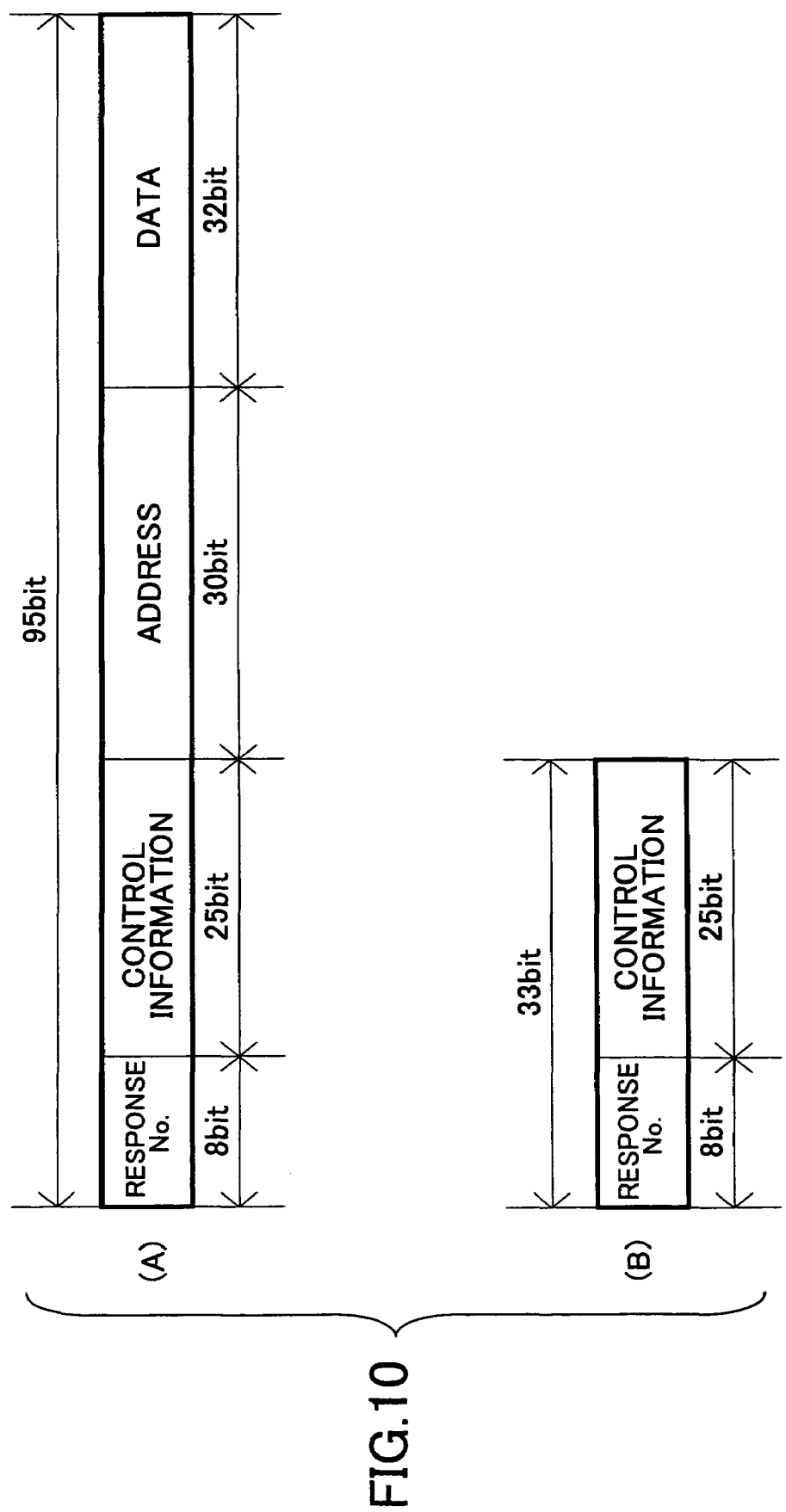
FIG. 10 is a diagram showing formats of responses between the shared memory cards of the operating system and the standby system according to the embodiment of the present invention.

FIG. 10 is a diagram showing formats of responses between the shared memory cards 304 and 305. In FIG. 10, (A) shows a format of a response at the time when the shared memory card 304 (operating system) executes write access to the shared memory card 305 (standby system) and the format is composed of a response number, control information, an address, and data. In addition, (B) shows a format of a response at the time when the shared memory card 305 (standby system) executes read access to the shared memory card 304 (operating system) and the format is composed of a response number and control information.

Next, advantages according to the embodiment of the present invention are explained in detail.

When the transfer rate in one processor card is studied, the transfer rate is 2.9 Gbps in a conventional system connected by a parallel bus (multi-connection) and the transfer rate in a system in which many processor cards are connected by serial buses according to the embodiment of the present invention is 2.1 Gbps. However, in the system according to the embodiment of the present invention, in which each processor card is connected to shared memory cards by a point-to-point structure via serial buses, a waiting time, which is needed in the conventional system so as to obtain a right connection to a bus, is not required. Therefore, plural processor cards can access shared memory cards at the same time and the transfer rate of the entire system becomes approximately 14 times that of the conventional system (refer to FIG. 11).

FIG. 11 is a table showing a comparison between a conventional multiprocessor system and the multiprocessor system according to the embodiment of the present invention. Referring to FIG. 11, major points of difference between the conventional multiprocessor system and the multiprocessor system according to the embodiment of the present invention are explained. In the conventional system, the number of bits of the parallel bus is 87 and is composed of address lines of 30 bits, data lines of 32 bits, and control lines of 25 bits. In the embodiment of the present invention, the transfer rate of the serial buses themselves is 2.66 Gbps; however, since this value includes serial transfer control (20% of the total), the effective transfer rate becomes 2.1 Gbps. The number of units connected to busses is 20 according to the embodiment of the present invention, and this signifies that 20 processor cards are installed in the system.

As described above, according to the embodiment of the present invention, since a processor card is connected to shared memory cards by a point-to-point structure via serial buses, the degradation of signal quality caused by adding another processor card does not occur. In addition, since confusion caused by connecting a new processor card to the serial buses does not occur, a processor card can be added in the system while the power source of the system is turning on.

In addition, when switching over from the operating system to the standby system is required due to some trouble in the shared memory card of the operating system, the switching over can be executed regardless of a command processing state, and control software of the processor card can continue the process without recognizing the switching over.

Moreover, when a connecting route to a shared memory card is hung up caused by a fault of a processor card, the other processor cards can access the shared memory cards without any damage from the fault.

Further, when an intermittent fault occurs in a transmission line of a point-to-point structure between a processor card and a shared memory card of an operating system, and between the shared memory card of the operating system and a shared memory card of a standby system, transferred data can be saved.

In claims, the FIFO 402 in the processor card 301 and the FIFO 320 in the shared memory card 305 of the standby system correspond to a command storing unit, the command resending section 311 in the processor card 301 corresponds to a command resending unit, the response monitoring section 312 in the shared memory card 305 of the standby system corresponds to a response monitoring unit, and the command number checking section 331 in the shared memory card 304 of the operating system corresponds to a command number checking unit. Further in claims, the command number checking and resending section 313 in the processor card 301 corresponds to a command number checking and resending unit, the FIFO 421 in the shared memory card 304 of the operating system corresponds to a response storing unit, the response number checking section 315 in the shared memory card 305 of the standby system corresponds to a response number checking unit, and the response number checking and resending section 314 in the shared memory card 304 of the operating system corresponds to a response number checking and resending unit.

Further, the present invention is not limited to the embodiment, but various variations and modifications may be made without departing from the scope of the present invention.

What is claimed is:

1. An access method for accessing first shared memory cards of an operating system and second shared memory cards of a standby system of redundant configuration, the access method comprising:

executing data transmission and reception between a plurality of processor cards and the first and second shared memory cards by the processor cards and the first and second shared memory cards, the processor cards being individually connected to each of the first and second shared memory cards on a one to one basis using serial buses;

storing, by one of the first shared memory cards and one of the second shared memory cards, a command sent from one of the processor cards in the one of the first shared memory cards and the one of the second shared memory cards; and discarding, by the one of the second shared memory cards, the command stored in the one of the second shared memory cards when the one of the second shared memory cards receives a response for the command from the one of the first shared memory cards within a given time, and processing, by the one of the second shared memory cards, the command stored in the one of the second shared memory cards when the one of the second shared memory cards does not receive the response for the command from the one of the first shared memory cards within the given time.

2. The access method as claimed in claim 1, further comprising:

storing, by the one of the processor cards, the command sent to the first and second shared memory cards in the one of the processor cards;

discarding, by the one of the processor cards, the command stored in the one of the processor cards when the one of the processor cards receives the response for the command from the one of the first shared memory cards, and resending, by the one of the processor cards, the command stored in the one of the processor cards to the one of the first shared memory cards and the one of the second shared memory cards when the one of the processor cards does not receive the response for the command from the one of the first shared memory cards; and processing, by the one of the second shared memory cards, the command resent from the one of the processor cards.

3. The access method as claimed in claim 1, further comprising:

storing, by the one of the processor cards, the command sent from the one of the processor cards to the first and second shared memory cards by attaching a command number to the command;

returning, by the one of the first shared memory cards, the response for the command to the one of the processor cards when the command number attached to the command sent from the one of the processor cards is not lost by checking the command number; and discarding, by the one of the processor cards, the command stored in the one of the processor cards when the one of the processor cards receives the response for the command to which the command number is attached from the one of the first shared memory cards, and resending, by the one of the processor cards, the command stored in the one of the processor cards to which the command number is attached to the one of the first shared memory cards and the one of the second shared memory cards when the one of the processor cards does not receive the response for the command from the one of the first shared memory cards.

4. The access method as claimed in claim 1, further comprising:

storing, by the one of the first shared memory cards, the response sent to the second shared memory card in the one of the first shared memory cards by attaching a response number to the response;

returning, by the one of the second shared memory cards, another response to the one of the first shared memory cards when the response number attached to the response sent from the one of the first shared memory cards is not lost by checking the response number; and discarding, by the one of the first shared memory cards, the response stored in the one of the first shared memory cards when the one of the first shared memory cards receives the other response from the one of the second shared memory cards, and resending, by the one of the first shared memory cards, the response stored in the one of the first shared memory cards to which the response number is attached to the one of the second shared memory cards when the one of the first shared memory cards does not receive the other response from the one of the second shared memory cards.

5. A multiprocessor system, comprising:

at least one first shared memory card of an operating system and at least one second shared memory card of a standby system of redundant configuration; and at least one processor card connected to each of the at least one first shared memory card and the at least one second shared memory card on a one to one basis using serial buses so that data sending from/to the at least one processor card to/from the at least one first shared memory card and the at least one second shared memory card is executed, wherein the at least one first shared memory card and the at least one second shared memory card each further includes
   a memory-card command storing unit storing a command sent from the at least one processor card; and the at least one second shared memory card includes
   a response monitoring unit discarding the command stored in the memory-card command storing unit when the second shared memory card receives a response for the command from the at least one first shared memory card within a given time, and processing the command stored in the memory-card command storing unit when the second shared memory card does not receive the response for the command from the at least one first shared memory card within the given time.

6. The multiprocessor system as claimed in claim 5, wherein the at least one processor card includes:
a processor-card command storing unit storing the command sent to the at least one first shared memory card and the at least one second shared memory card; and
a command resending unit discarding the command stored in the processor-card command storing unit when the at least one processor card receives the response for the command from the at least one first shared memory card, and resending the command stored in the processor-card command storing unit to the at least one first shared memory card and the at least one second shared memory card when the at least one processor card does not receive the response for the command from the at least one first shared memory card, and
wherein the response monitoring unit of the at least one second shared memory card processes the command resent from the command resending unit of the at least one processor card.

7. The multiprocessor system as claimed in claim 5, wherein the at least one processor card further includes
a processor-card command storing unit storing the command sent to the at least one first shared memory card and the at least one second shared memory card by attaching a command number to the command; and
a command number checking and resending unit discarding the command stored in the processor-card command storing unit when the at least one processor card receives the response for the command to which the command number is attached from the at least one first shared memory card, and resends the command stored in the processor-card command storing unit to which the command number is attached to the at least one first shared memory card and the at least one second shared memory card when at least one processor card does not receive the response for the command from the at least one first shared memory card; and
the at least one first shared memory card further includes
a command number checking unit returning the response for the command to the at least one processor card when the command number attached to the command sent from the at least one processor card is not lost by checking the command number.

8. The multiprocessor system as claimed in claim 5, wherein:
the at least one first shared memory card further includes
a response storing unit storing the response sent to the at least one second shared memory card by attaching a response number; and
a response number checking and resending unit discarding the response stored in the response storing unit when the at least one first shared memory receives another response for the sent response from the at least one second shared memory card, and resends the response stored in the response storing unit to which the response number is attached to the at least one second shared memory card when the at least one first shared memory card does not receive the other response from the at least one second shared memory card: and
the at least one second shared memory card further includes
a response number checking unit returning the other response to the at least one first shared memory card when the response number attached to the response sent from the first shared memory card is not lost by checking the response-number.

* * * * *